(12) United States Patent
Nasu et al.

(10) Patent No.: US 11,509,396 B2
(45) Date of Patent: Nov. 22, 2022

(54) POLARIZATION MULTI/DEMULTIPLEXED OPTICAL TRANSCEIVER CIRCUIT

(71) Applicant: Nippon Telegraph and Telephone Corporation, Tokyo (JP)

(72) Inventors: Yusuke Nasu, Musashino (JP); Shogo Yamanaka, Musashino (JP); Yuichiro Ikuma, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/433,099

(22) PCT Filed: Mar. 19, 2020

(86) PCT No.: PCT/JP2020/012172
§ 371 (c)(1),
(2) Date: Aug. 23, 2021

(87) PCT Pub. No.: WO2020/196216
PCT Pub. Date: Oct. 1, 2020

(65) Prior Publication Data
US 2022/0045764 A1    Feb. 10, 2022

(30) Foreign Application Priority Data
Mar. 26, 2019   (JP) .............................. JP2019-059023

(51) Int. Cl.
*H04B 10/40*    (2013.01)
*H04J 14/06*    (2006.01)
(Continued)

(52) U.S. Cl.
CPC ............. *H04B 10/40* (2013.01); *G02F 1/225* (2013.01); *G02F 2/00* (2013.01); *H04B 10/532* (2013.01); *H04B 10/6166* (2013.01); *H04J 14/06* (2013.01)

(58) Field of Classification Search
CPC ...................................................... H04J 14/06
See application file for complete search history.

(56) References Cited

U.S. PATENT DOCUMENTS 10,193,653 B2 *   1/2019   Kamei ................ H04B 10/532
2003/0090768 A1 *  5/2003   Liu .................... H04B 10/2569
                                                           398/185
(Continued)

FOREIGN PATENT DOCUMENTS

JP        2017-98362 A    6/2017
JP        62-63312 B2    12/2017
(Continued)

OTHER PUBLICATIONS

Bo Zhang et al., *Practical Limits of Coherent Receivers for Unamplified 100Gb/s Applications*, Proceeding of OFC2013, Mar. 17, 2013, pp. 1-3.

*Primary Examiner* — Nathan M Cors
(74) *Attorney, Agent, or Firm* — Workman Nydegger (57) ABSTRACT

Provided is a polarization multiplexing optical transmitting and receiving circuit that compensates for transmission side PDL so as to suppress a reduction in transmission power and makes a branching ratio of light from a light source variable between a transmission side and a receiving side according to a system to be used. The polarization multiplexing optical transmitting and receiving circuit includes an optical variable branching circuit that branches the light output from the light source, a light fixing symmetric branching circuit connected to one of outputs of the optical variable branching circuit and a light fixing asymmetric branching circuit (Continued)

connected to the other, optical receivers connected to two outputs of the light fixing symmetric branching circuit, respectively, optical transmitters connected to two outputs of the light fixing asymmetric branching circuit, a polarized wave rotator connected to one of the optical transmitters, and a polarized wave multiplexer that polarization-multiplexes the outputs of the optical transmitters.

8 Claims, 5 Drawing Sheets

(51) Int. Cl.
*G02F 1/225* (2006.01)
*G02F 2/00* (2006.01)
*H04B 10/532* (2013.01)
*H04B 10/61* (2013.01)

(56) References Cited

U.S. PATENT DOCUMENTS

| | | | | |
|---|---|---|---|---|
| 2010/0067914 | A1* | 3/2010 | Tanaka | H04J 14/06 398/102 |
| 2014/0023368 | A1* | 1/2014 | Bhandare | H04B 10/5053 398/184 |
| 2015/0125152 | A1* | 5/2015 | Ji | H04B 10/5561 398/76 |
| 2018/0139007 | A1* | 5/2018 | Kamei | H04J 14/06 |

FOREIGN PATENT DOCUMENTS

| | | |
|---|---|---|
| JP | 2018-116199 A | 7/2018 |
| JP | 2018-186414 A | 11/2018 |
| WO | 2016/166971 A1 | 10/2016 |

* cited by examiner

POLARIZATION MULTI/DEMULTIPLEXED OPTICAL TRANSCEIVER CIRCUIT

TECHNICAL FIELD

The present invention relates to a polarization multiplexing optical transmission circuit, and more specifically, to a polarization multiplexing optical transmitting and receiving circuit for an integrated coherent polarization multiplexing system.

BACKGROUND ART

In recent years, especially in long-distance optical communications, digital coherent type optical transmission systems capable of dramatically increasing the communication capacity per channel have been developed and their introduction into commercial use is progressing. In the digital coherent type optical communications, a polarization multiplexing system in which the amount of transmission is doubled by providing different signals to two polarized waves (polarized light) orthogonal to each other is generally adopted.

Although there are various signal formats for providing signals to respective polarized waves, most of systems having a communication capacity of 100 Gbit/s per channel, which are currently being most actively introduced into commercial use, adopt QPSK (Quadrature Phase Shift Keying). It is conceived that, in a system having a communication capacity of 100 Gbit/s or more, expansion of the capacity using the digital coherent system will be the mainstream in the future.

Figure 1:
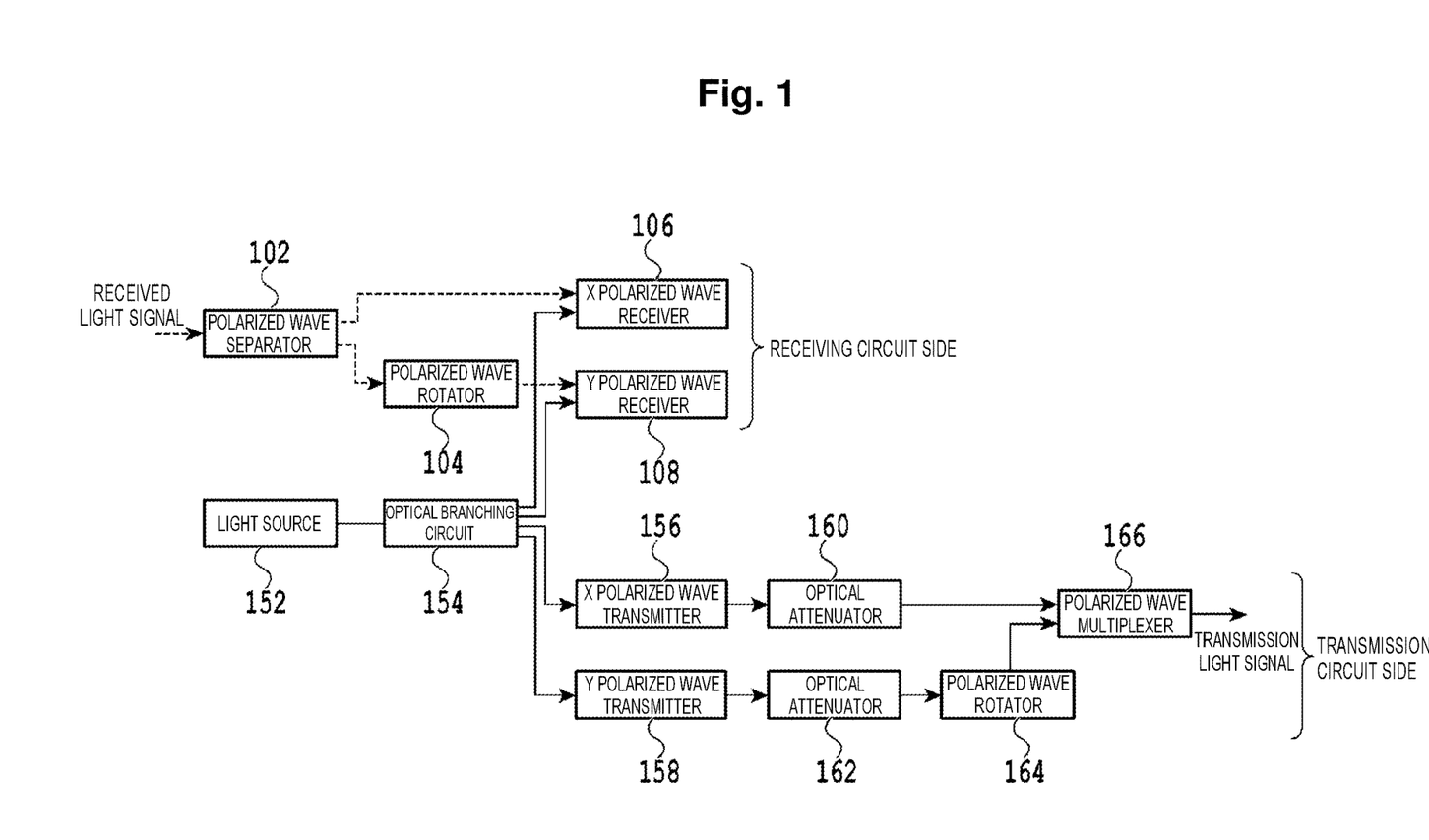
FIG. 1 is a diagram illustrating the configuration of an optical transmission circuit and a receiving circuit in a digital coherent polarization multiplexing type transceiver.

FIG. 1 illustrates the overall configuration of a transceiver including an optical transmission circuit and a receiving circuit, which is configured in a digital coherent polarization multiplexing type transceiver. Details of FIG. 1 will be described below.

The receiving circuit is configured to include a polarized wave separator 102, an X polarized wave receiver 106 connected to one of outputs of the polarized wave separator, a polarized wave rotator 104 connected to the other of the outputs of the polarized wave separator, and a Y polarized wave receiver 108 connected to the polarized wave rotator.

The transmission circuit is configured to include a light source 152, an optical branching circuit 154 connected to the light source, an X polarized wave transmitter 156 connected to one of outputs of the optical branching circuit, a Y polarized wave transmitter 158 connected to the other of the outputs of the optical branching circuit, an optical attenuator 160 connected to an output of the X polarized wave transmitter, an optical attenuator 162 connected to an output of the Y polarized wave transmitter, a polarized wave rotator 164 connected to an output of the optical attenuator 162, and a polarized wave multiplexer 166 connected to outputs of the optical attenuator 160 and the polarized wave rotator 164.

In the configuration of the receiving circuit, the polarized wave separator 102 separates the received light signal into the X polarized wave and the Y polarized wave. The polarization-separated polarized wave light is input to the X polarized wave receiver 106 and the Y polarized wave receiver 108, respectively.

Each of the X polarized wave receiver 106 and the Y polarized wave receiver 108 is an optical coherent mixer that is configured by a mixer, a photodetector, or the like, and converts an optical signal into an electric signal. In order to extract phase information of the received light, not only the received light signal but also the light from the light source 152 mounted in the transceiver, after which has been branched by the optical branching circuit 154, are input into the X polarized wave receiver 106 and the Y polarized wave receiver 108. Then, the information is extracted from the signal light by causing them to interfere with each other.

On the other hand, in the configuration of the transmission circuit, the light source 152 in the transceiver is also used to generate a transmission light signal. A part of the light from the light source 152, which has been branched by the optical branching circuit 154, is input to the X polarized wave transmitter 156 and the Y polarized wave transmitter 158.

Each of the X polarized wave transmitter 156 and the Y polarized wave transmitter 158 converts an electric signal to be transmitted into an optical signal. The transmission light signal output from the Y polarized wave transmitter 158 is converted, at the polarized wave rotator 164 in the subsequent stage, into a polarized wave orthogonal to a polarized wave on the X polarized wave transmitter side.

The polarized wave multiplexer 166 multiplexes two transmission light signals, which are output from the X polarized wave transmitter 156 and the Y polarized wave transmitter 158 respectively and are orthogonal to each other. As a result, on the orthogonally polarized waves, different kinds of information are superimposed on the transmission light signals, respectively.

Downsizing the above-described digital coherent polarization multiplexing type optical transmission and receiving circuits is required. And, it has been studied to integrate these circuits on one chip by using a photonic integrated circuit (PIC) configured by an InP (indium phosphide) optical waveguide or a silicon optical waveguide. However, the light source 152 may be provided outside the chip considering differences in material and manufacturing method.

The light source 152 in the transceiver may be provided separately for the transmitter and the receiver. However, in order to realize downsizing and low power consumption in recent transceivers, using the configuration of FIG. 1 in which one light source is shared for transmission and reception is increasing. The optical branching circuit 154 illustrated in FIG. 1 is provided to share the light source 152, and is necessary to be set so that the limited light source power is efficiently used and the transceiver performance is maximized.

For example, regarding the ratio of branching according to which the optical branching circuit 154 distributes the continuous light from the light source 152 to the transmission circuit side and the receiving circuit side, the optimum branching ratio varies depending on the presence or absence of power restrictions on the light source 152 or the presence or absence of an amplifier in the transmission path for transmission, or the like. The optimization of this branching ratio is described in detail in Non-Patent Literature 1, and it is indicated that asymmetry up to transmission side:receiving side=approximately 70:30 is suitable depending on conditions (the transmission distance of an optical signal can be maximized). On the other hand, when there is no restriction on the power of the light source 152 or on the transmission path, transmission side:receiving side=approximately 50:50 is suitable.

Further, regarding the light intensity to be branched between the X polarized wave transmitter 156 and the Y polarized wave transmitter 158 on the transmission circuit side, an asymmetric branching ratio is also required. In the process of polarization-multiplexing and outputting the signal light output from the X polarized wave transmitter 156 and the Y polarized wave transmitter 158, the loss received by each polarized wave is different. For example, the polarized wave rotator 164 is present on only the side of one transmission path of the X polarized wave transmitter 156 or the Y polarized wave transmitter 158 (in the example illustrated in FIG. 1, only the transmission path on the Y polarized wave transmitter 158 side), a circuit excessive loss of approximately 1 to 2 dB occurs. In addition, due to various losses, a difference in loss occurs between the X polarized wave and the Y polarized wave of a transmission signal. Therefore, it is required to branch the light from the light source 152 between the X polarized wave side and the Y polarized wave side at an asymmetric branching ratio, in advance in the optical branching circuit 154, so as to compensate for the difference in loss between the X polarized wave and the Y polarized wave. Hereinafter, the above-described difference in loss occurring between the X polarization circuit side path and the Y polarization circuit side path in the transmission circuit is referred to as transmission side polarization-dependent loss (transmission side PDL).

In order to efficiently use the light of the light source 152 for power consumption reduction and downsizing of the transceiver, the design of the optical branching circuit 154 is important and the method disclosed in Patent Literature 1 or the like has been proposed as an efficient method for eliminating the transmission side PDL. This method is for realizing the required asymmetric branching while minimizing the excessive loss as a means for setting the branching ratio of the transmission circuit side:the receiving circuit side in the optical branching circuit 154 to be asymmetric and setting the branching ratio between the X polarized wave transmitter 156:the Y polarized wave transmitter 158 to be asymmetric so that the power difference between polarized waves of the transmission light is reduced.

CITATION LIST

Patent Literature

Patent Literature 1: Japanese Patent No. 6,263,312

Non-Patent Literature

Non-Patent Literature 1: Bo Zhang et al., "Practical Limits of Coherent Receivers for Unamplified 100 Gb/s Applications", Proceeding of OFC2013, OW1E.3, (2013)

SUMMARY OF THE INVENTION

Technical Problem

In a general transceiver, a method for giving an optical loss to the light of a light source distributed to a transmitter or a receiver is used to adjust the intensity of light. For example, the continuous light from the light source is branched to the transmission side and the receiving side, and a loss is given to the light on at least one side, thereby adjusting an apparent branching ratio. Further, in order to make intensities of respective polarized waves of the transmission light uniform, in other words, in order to set the transmission side PDL to 0, the adjustment is performed by giving a loss to the light intensity of the polarized wave on one side. For example, an intensity adjuster using a semiconductor optical amplifier (SOA), an attenuator using an interferometer, an attenuator using absorption at a PN junction, or the like is used to perform level adjustment.

However, the branching ratio adjustment based on the given loss is inefficient from the viewpoint of power and signal quality, because it is necessary to increase the output power of the light source by taking the amount of loss into consideration. Further, it may be possible to determine the light source branching ratio between the transmission side and the receiving side of the transceiver according to a transmission system to be used, and preliminarily design and optimize various branching ratios of the transmission circuit so that the transmission side PDL becomes 0. However, it is necessary to design for each system and there is a problem that the design and usage method are complicated, although a highly efficient transmitter/receiver may be realized in a specific system.

The present invention has been made in view of the above-described problems and intends to compensate for transmission side PDL so as to suppress a reduction in transmission power, and/or to make the branching ratio of light from a light source variable between a transmission side and a receiving side according to a system to be used.

Means for Solving the Problem

In order to achieve the above-described purpose, one aspect of the present invention is a polarization multiplexing optical transmitting and receiving circuit that includes first and second optical receivers, first and second optical transmitters, a polarized wave multiplexer that polarization-multiplexes two optical transmitter outputs of the first and second optical transmitters, a polarized wave rotator arranged between the first and second optical transmitters and the polarized wave multiplexer, and connected to at least one of the first and second optical transmitters, and at least three optical branching circuits that branch light output from a light source to the first and second optical receivers as well as to the first and second optical transmitters. The at least three optical branching circuits include at least one optical variable branching circuit.

In one embodiment, the at least three optical branching circuits include an optical variable branching circuit that branches the light output from the light source, a first optical branching circuit connected to one of two outputs of the optical variable branching circuit, and a second optical branching circuit connected to the other of the two outputs of the optical variable branching circuit, wherein the first and second optical receivers are connected to two outputs of the first optical branching circuit, respectively, and the first and second optical transmitters are connected to two outputs of the second optical branching circuit, respectively.

In one embodiment, the at least three optical branching circuits include a first optical variable branching circuit that branches the light output from the light source, a second optical variable branching circuit arranged at one of two outputs of the first optical variable branching circuit, and an optical branching circuit connected to one of two outputs of the second optical variable branching circuit, wherein the first and second optical receivers are connected to two outputs of the optical branching circuit, respectively, the first optical transmitter is connected to the other of the two outputs of the second optical variable branching circuit, and the second optical transmitter is connected to the other of the two outputs of the first optical variable branching circuit.

In one embodiment, the at least three optical branching circuits include a first optical variable branching circuit that branches the light output from the light source, an optical branching circuit connected to one of two outputs of the first optical variable branching circuit, and a second optical variable branching circuit arranged at the other of the two outputs of the first optical variable branching circuit, wherein the first and second optical receivers are connected to two outputs of the optical branching circuit, respectively, and the first and second optical transmitters are connected to two outputs of the second optical variable branching circuit, respectively.

In one embodiment, the at least three optical branching circuits include a first optical branching circuit that branches the light output from the light source, a second optical branching circuit connected to one of two outputs of the optical branching circuit, and an optical variable branching circuit connected to the other of the two outputs of the optical branching circuit, wherein the first and second optical receivers are connected to two outputs of the second optical branching circuit, respectively, and the first and second optical transmitters are connected to two outputs of the optical variable branching circuit, respectively.

Effects of the Invention

As described above, according to the present invention, it is possible to provide a polarization multiplexing optical transmitting and receiving circuit that compensates for transmission side PDL so as to suppress a reduction in transmission power. Further, it is possible to provide a polarization multiplexing optical transmitting and receiving circuit that makes a branching ratio of light from a light source variable between a transmission side and a receiving side according to a system to be used.

DESCRIPTION OF EMBODIMENTS

Hereinafter, embodiments of the present invention will be described in detail with reference to attached drawings. The same or similar reference numerals indicate the same or similar elements, and repetitive descriptions thereof will be omitted.

A polarization multiplexing optical transmitting and receiving circuit described below includes a transmitter and a receiver. The transmitter includes an X polarized wave transmitter and a Y polarized wave transmitter. The receiver includes an X polarized wave receiver and a Y polarized wave receiver. The polarization multiplexing optical transmitting and receiving circuit branches continuous light from a light source to the X polarized wave transmitter and the Y polarized wave transmission, as well as to the X polarized wave receiver and the Y polarized wave receiver. The X polarized wave transmitter and the Y polarized wave transmission superimpose transmission information on the branched continuous light from the light source by using a modulator, and generates an optical output. The X polarized wave receiver and the Y polarized wave receiver use the branched continuous light from the light source as local oscillation light.

To branch the continuous light from the light source to the X polarized wave transmitter and the Y polarized wave transmitter as well as to the X polarized wave receiver and the Y polarized wave receiver, the polarization multiplexing optical transmitting and receiving circuit includes at least three 1-input 2-output optical branching circuits, at least one of which being an optical variable branching circuit. All the 1-input 2-output optical branching circuits may be optical variable branching circuits.

The polarization multiplexing optical transmitting and receiving circuit is a small-sized circuit integrated on a silicon chip together with an InP chip or a silicon optical waveguide, together with an InP (indium phosphide) optical waveguide.

First Embodiment

Figure 2:
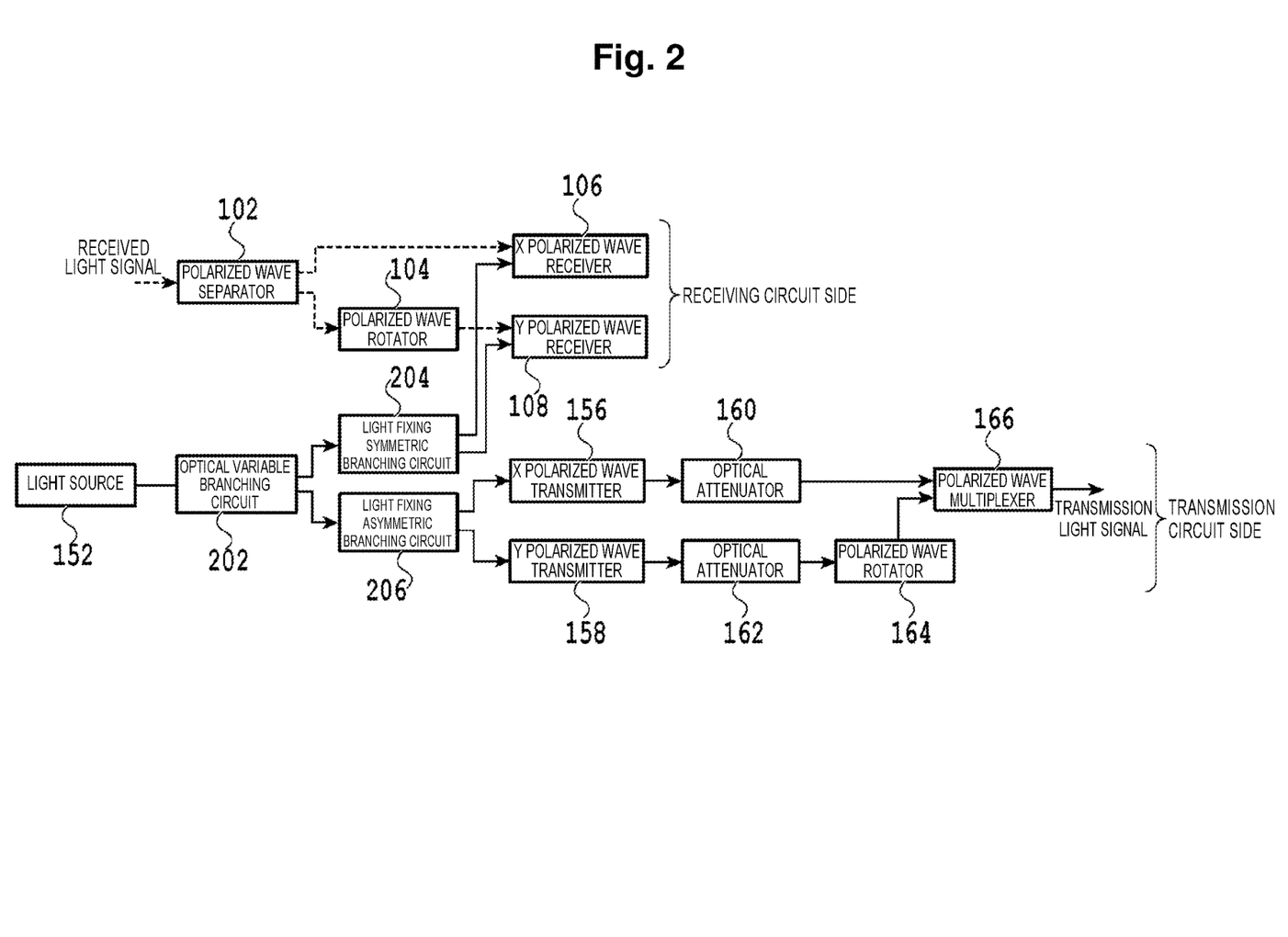
FIG. 2 is a diagram illustrating the configuration of a polarization multiplexing optical transmitting and receiving circuit according to a first embodiment of the present invention.

A polarization multiplexing optical transmitting and receiving circuit according to a first embodiment of the present invention will be described with reference to FIG. 2. FIG. 2 is a circuit diagram illustrating a configuration of the polarization multiplexing optical transmitting and receiving circuit according to the first embodiment of the present invention, in which a part of an optical transmitter/receiver having transmission and receiving functions is illustrated. The polarization multiplexing optical transmitting and receiving circuit branches the continuous light from the light source, superimposes transmission information by using a modulator, and generates an optical output. At the same time, the polarization multiplexing optical transmitting and receiving circuit uses the continuous light from the light source, as local oscillation light of the receiving circuit, and coherent-receives a reception signal.

The polarization multiplexing optical transmitting and receiving circuit illustrated in FIG. 2 includes a light source 152, an optical variable branching circuit 202, a light fixing symmetric branching circuit 204, and a light fixing asymmetric branching circuit 206. The optical variable branching circuit 202 branches light output from the light source 152. The light fixing symmetric branching circuit 204 and the light fixing asymmetric branching circuit 206 are arranged at one and the other of two waveguides connected to outputs of the optical variable branching circuit 202, respectively. Further, the polarization multiplexing optical transmitting and receiving circuit includes a polarized wave separator 102, an X polarized wave receiver 106, a polarized wave rotator 104, and a Y polarized wave receiver 108. Here, the polarized wave separator 102 receives and polarization-separates a received light signal, as a configuration on the receiving circuit side. The X polarized wave receiver 106 receives the polarization-separated X polarized wave and one of outputs of the light fixing symmetric branching circuit 204. The polarized wave rotator 104 polarization-rotates the polarization-separated Y polarized wave. The Y polarized wave receiver 108 receives the polarization-rotated Y polarized wave and the other of the outputs of the light fixing symmetric branching circuit 204. Further, the polarization multiplexing optical transmitting and receiving circuit includes an X polarized wave transmitter 156, a Y polarized wave transmitter 158, a polarized wave synthesizer 166, and a polarized wave rotator 164. The X polarized wave transmitter 156 receives one of outputs of the light fixing asymmetric branching circuit 206, as a configuration on the transmission circuit side. The Y polarized wave transmitter 158 receives the other of the outputs of the light fixing asymmetric branching circuit 206. The polarized wave synthesizer 166 polarization-multiplexes outputs of the X polarized wave transmitter 156 and the X polarized wave transmitter 158 to output a transmission light signal. The polarized wave rotator 164 is arranged between the X polarized wave transmitter 156 and the Y polarized wave transmitter 158 and the polarized wave synthesizer 166, and is connected to at least one of the X polarized wave transmitter 156 and the Y polarized wave transmitter 158. As illustrated in FIG. 2, optical attenuators 160 and 162 are connected to the X polarized wave transmitter 156 and the Y polarized wave transmitter 158, respectively.

The optical variable branching circuit 202 branches the continuous light from the light source 152 into two, and distributes one light to the transmission circuit side and the other light to the receiving circuit side.

The light fixing asymmetric branching circuit 206 branches the light, branched to the transmission circuit side, for the X polarized wave transmitter 156 and the Y polarized wave transmitter 158. The light branched by the light fixing asymmetric optical branching circuit 206 is input to each of the X polarized wave transmitter 156 and the Y polarized wave transmitter 158. The branching ratio of the light fixing asymmetric optical branching circuit 206 will be described below.

Each of the X polarized wave transmitter 156 and the Y polarized wave transmitter 158 is configured by an IQ modulator or the like configured by a Mach-Zehnder interferometer or the like, and serves as a portion for transmitting information by modulating the phase and intensity of the input light. The signals modulated by the X polarized wave transmitter 156 and the Y polarized wave transmitter 158 are converted into X polarized wave and Y polarized wave that are orthogonal to each other, and multiplexed so as to be transmitted as a polarization multiplexing multi-value phase modulation signal.

The polarized wave rotator 164 polarization-converts the light modulated by the Y polarized wave transmitter 158. The polarized wave rotator 164 may be arranged so as to polarization-convert the light modulated by the X polarized wave transmitter 158.

The polarized wave multiplexer 166 multiplexes the light modulated by the X polarized wave transmitter 156 and the light modulated by the Y polarized wave transmitter 158 and polarization-converted by the polarized wave rotator 164 and outputs a transmission light signal.

Of the light modulated by the X polarized wave transmitter 156 and the light modulated by the Y polarized wave transmitter 158, only the Y polarization light from the Y polarized wave transmitter 158 passes through the polarized wave rotator 164. Therefore, the transmission side PDL is generated by the amount of loss at the polarized wave rotator 164. Further, if there is any polarization-dependent loss in the subsequent stage of the polarized wave multiplexer 166, the transmission side PDL increases. Such a possibly occurring transmission side PDL causes an intensity difference between the polarized waves of the transmission light, and deteriorates the signal quality. However, since the transmission side PDL that may occur can be grasped at the time of design, the difference in intensity between the X polarized wave and the Y polarized wave of the transmission light signal can be set to 0, by making the intensity of light to be input to the X polarized wave transmitter 156 and the Y polarized wave transmitter 158 asymmetric in advance. In this manner, the branching ratio of the light fixing asymmetric optical branching circuit 206 is set to compensate for the transmission side PDL.

Each of the X polarized wave receiver 106 and the Y polarized wave receiver 108 is configured by a 90-degree hybrid circuit and a light-receiving element. Causing the received light signal to interfere with the local oscillation light, so that the interfere light enters a plurality of light-receiving elements. This makes it possible to convert the phase and intensity information superimposed on the received light signal into an electric signal as transmission information.

The light fixing symmetric branching circuit 204 branches the light, branched from the optical variable branching circuit 202 to the receiving circuit side, for the X polarized wave receiver 106 and the Y polarized wave receiver 108. These lights are input, as local oscillation light of the receiving portion (the receiving circuit side), to the X polarized wave receiver 106 and the Y polarized wave receiver 108. Two paths, i.e., the path from the optical variable branching circuit 202 to the X polarized wave receiver 106 and the path from the optical variable branching circuit 202 to the Y polarized wave receiver 108, can be easily connected so as to be the same in the loss designed. Therefore, the branching ratio of the circuit for branching the continuous light from the light source 152 to the X polarized wave receiver 106 and the Y polarized wave receiver 108 may be symmetric (50:50) in design.

In the present embodiment, the continuous light of the light source is branched by three circuits of the optical variable branching circuit 202, the light fixing symmetric branching circuit 204, and the light asymmetric branching circuit 206, and is used on the transmission side and the receiving side. All the three circuits used in this case are circuits in which the loss is unlikely to occur in principle.

Figure 3:
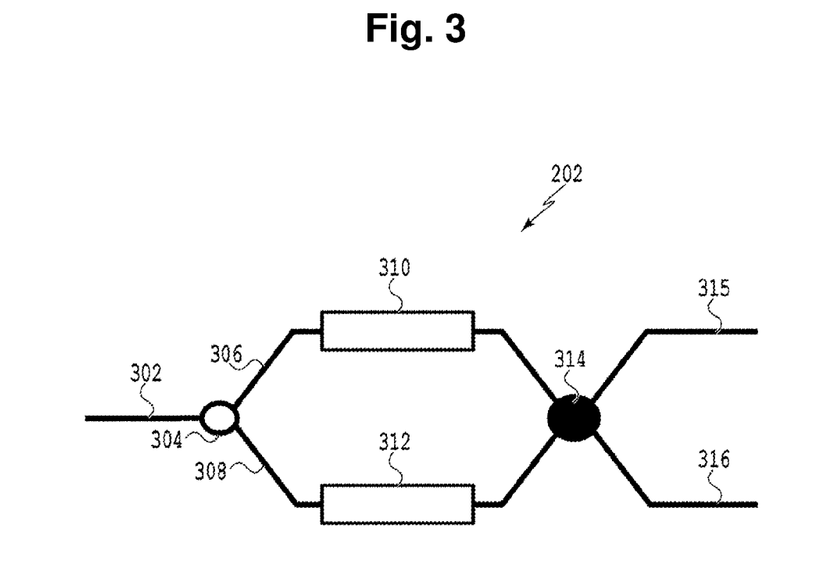
FIG. 3 is a diagram illustrating an exemplary configuration of an optical variable branching circuit in the polarization multiplexing optical transmitting and receiving circuit according to one embodiment.

FIG. 3 is a diagram illustrating an exemplary configuration of the optical variable branching circuit 202 that is configured as the circuit in which the loss is unlikely to occur in principle. A symmetric Mach-Zehnder interferometer illustrated in FIG. 3 is usable to configure the optical variable branching circuit 202. The symmetric Mach-Zehnder interferometer includes an input waveguide 302, two arm waveguides 306 and 308, two output waveguides 315 and 316, a 1-input 2-output coupler 304, and a 2-input 2-output coupler 314. Here, the 1-input 2-output coupler 304 is connected to the input waveguide 302 and the two arm waveguides 306 and 308. The 2-input 2-output coupler 314 is connected to the two arm waveguides 306 and 308 and the two output waveguides 315 and 316. The two arm waveguides 306 and 308 are provided with variable optical phase shifters 310 and 312, respectively. The variable optical phase shifter changes the phase of propagating light by changing the refractive index of the optical waveguide. In general, the heat of a heater provided near the waveguide or the carrier density variation in a PN junction is used to cause the refractive index variation of the waveguide to change so as to change the optical phase. The variable optical phase shifter may be provided on at least one of the two arm waveguides 306 and 308.

In the optical variable branching circuit 202, light incident from the input waveguide 302 is branched to the arm waveguide 306 and the arm waveguide 308 by the 1-input 2-output coupler 304. The branched light is adjusted, with respect to the phase of light, by the variable optical phase shifter provided on at least one of the two arm waveguides, and is multiplexed by the 2-input 2-output coupler. Adjusting the phase of propagating light by the variable optical phase shifter can adjust the ratio between the intensity of light output to the output waveguide 315 and the intensity of light output to the output waveguide 316, without changing the total intensity of light to be output to the output waveguides 315 and 316. That is, the symmetric Mach-Zehnder interferometer illustrated in FIG. 3 is, in principle, the optical variable branching circuit 202 in which no loss occurs. By controlling the amount of phase of light to be adjusted by the variable optical phase shifters 310 and 312, the branching ratio between the output waveguides 315 and 316 can be adjusted to 50:50 or 70:30, or the like.

The symmetric Mach-Zehnder interferometer illustrated in FIG. 3, in order to realize a simpler variable operation, uses the 1-input 2-output coupler 304 that is a 1-input 2-output power splitter (a circuit in which the input light is branched in the same phase) for the coupler on the input waveguide 302 side, and uses the 2-input 2-output coupler 314 for the coupler on the output waveguides 315 and 316 side. In this case, by designing the arm waveguides 306 and 308 to be the same in length, the branching ratio of 50:50 can be realized in the initial state.

In the case of changing the branching ratio of the symmetric Mach-Zehnder interferometer illustrated in FIG. 3 from 50:50 of the initial state to 70:30, the change to 70:30 can be realized by driving the variable optical phase shifters 310 and 312.

In the configuration of the polarization multiplexing optical transmitting and receiving circuit according to the present embodiment, it is possible to efficiently use the light of the light source without causing loss by setting the branching ratio between the transmission circuit side and the receiving circuit side by the optical variable branching circuit 202, so that the best performance can be achieved in a transmission path where the polarization multiplexing optical transmitting and receiving circuit is actually used, and setting the branching ratio of the light fixing asymmetric branching circuit 206 so as to compensate for the transmission PDL of the X polarized wave transmitter 156 and the Y polarized wave transmitter 158.

For example, the polarization multiplexing optical transmitting and receiving circuit according to the present embodiment can be implemented in a short-distance transmission system having no erbium-doped optical fiber amplifier (EDFA), a short-distance transmission system having the EDFA, or an intermediate-distance transmission system, by changing the balance between the reception sensitivity (performance) on the receiving circuit side and the optical output on the transmission circuit side.

Although the optical attenuators 160 and 162 are illustrated in FIG. 2, they are not always required in the present embodiment, since the optical attenuators 160 and 162 are unnecessary for output power adjustment of respective polarized waves. The optical attenuators may be integrated when a shutter function is required, for example, when completely extinguishing the output light.

Second Embodiment

Figure 4:
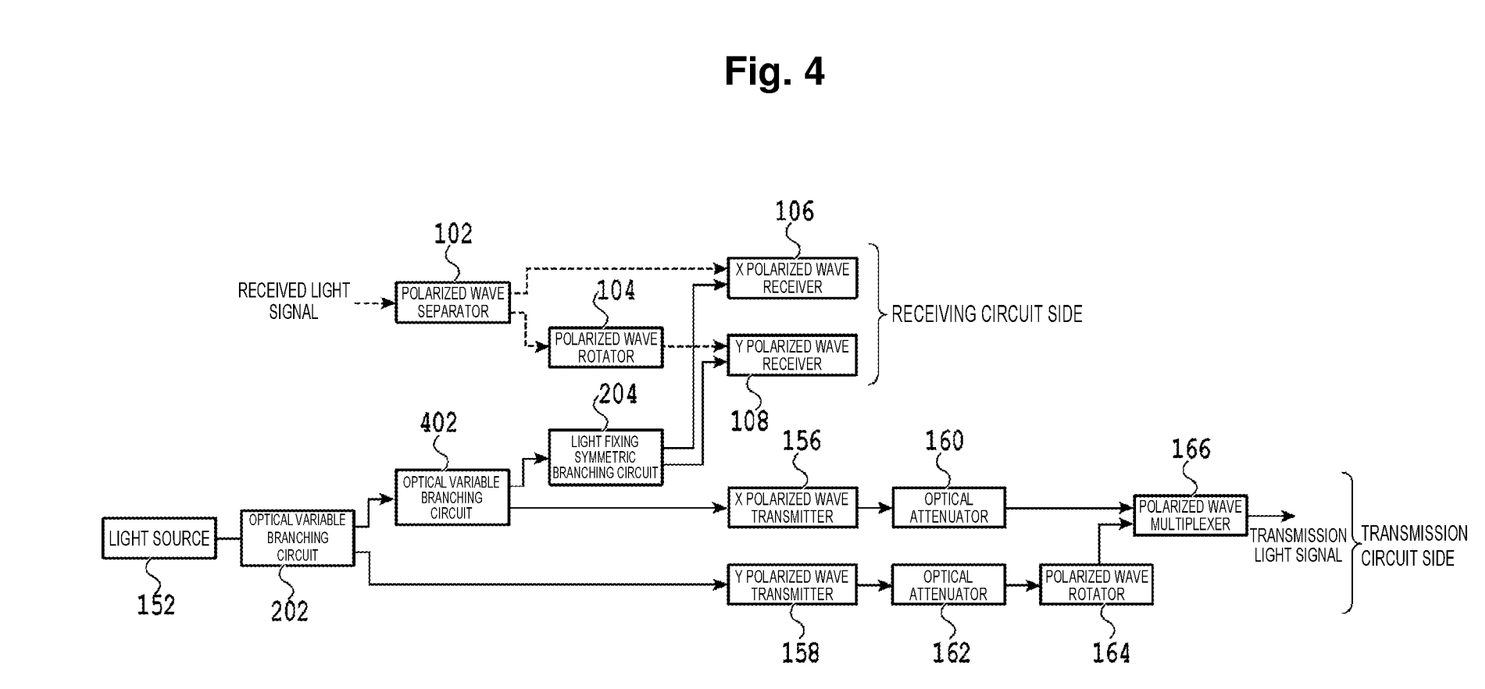
FIG. 4 is a diagram illustrating the configuration of a polarization multiplexing optical transmitting and receiving circuit according to a second embodiment of the present invention.

A polarization multiplexing optical transmitting and receiving circuit according to a second embodiment of the present invention will be described with reference to FIG. 4. FIG. 4 is a circuit diagram illustrating the configuration of the polarization multiplexing optical transmitting and receiving circuit according to the second embodiment of the present invention, in which a part of an optical transmitter/receiver having transmission and receiving functions is illustrated. The polarization multiplexing optical transmitting and receiving circuit branches the continuous light from the light source, superimposes transmission information by using a modulator, and generates an optical output. At the same time, the polarization multiplexing optical transmitting and receiving circuit uses the continuous light from the light source, as local oscillation light of the receiving circuit, and coherent-receives a reception signal.

The polarization multiplexing optical transmitting and receiving circuit illustrated in FIG. 4 is different from the polarization multiplexing optical transmitting and receiving circuit of FIG. 2 in the following points. First, an optical variable branching circuit 402 is provided between the optical variable branching circuit 202 and the light fixing symmetric branching circuit 204. Further, one of the two outputs of the optical variable branching circuit 202 is connected to the input of the optical variable branching circuit 402, and the other output is connected to the input of the Y polarized wave transmitter 158. Further, one of the two outputs of the optical variable branching circuit 402 is connected to the input of the light fixing symmetric branching circuit 204, and the other output is connected to the input of the X polarized wave transmitter 156. In addition, the light fixing asymmetric branching circuit 206 is not provided.

Like the optical variable branching circuit 202, the optical variable branching circuit 402 can be configured by using the symmetric Mach-Zehnder interferometer described with reference to FIG. 3. The continuous light from the light source 152 is branched into two by the optical variable branching circuit 202, one light is input to the Y polarized wave transmitter 158, and the other light is input to the optical variable branching circuit 402.

The light input to the optical variable branching circuit 402 is branched into two, one light is input to the X polarized wave transmitter 156, and the other light is input to the light fixing symmetric branching circuit 204 for the receiver. The first-stage optical variable branching circuit 202 branches the light to the Y polarized wave transmitter 158, and the second-stage optical variable branching circuit 402 branches the light to the X polarized wave transmitter 156. As a result, the light branched from the first-stage optical variable branching circuit 202 and having higher light intensity can be input to the Y polarized wave transmitter 158 on the path with high loss. Therefore, it is possible to configure a circuit that utilizes the light of the light source more efficiently. Although it may be a repetitive description, the reason why the loss is high in the path where the Y polarized wave transmitter 158 is arranged is because the polarized wave rotator 164 is installed after the transmitter.

Since two optical variable branching circuits 202 and 402 are used, the second embodiment of the present invention is complicated in configuration compared to the first embodiment. However, the second embodiment can make variable the intensity of light incident on each of the X polarized wave transmitter 156 and the Y polarized wave transmitter 158, and further can make variable the intensity of light branched to the transmission circuit side and the receiving circuit side. Therefore, it is possible to maximize the performance of the transmitter/receiver according to an individual transmission system, and eliminate differences in transmission light intensity between the X polarized wave and the Y polarized wave.

In the polarization multiplexing optical transmitting and receiving circuit illustrated in FIG. 4, the example in which the optical variable branching circuit 402 is arranged between the optical variable branching circuit 202 and the light fixing symmetric branching circuit 204 has been described, as a connection form of three 1-input 2-output optical branching circuits. Instead of this connection form of three optical branching circuit, one of the two outputs of the optical variable branching circuit 202 may be connected to the input of the light fixing symmetric branching circuit 204, and the other output may be connected to the optical variable branching circuit 402. In this alternative example, the X polarized wave receiver 106 and the Y polarized wave receiver 108 are connected to the two outputs of the light fixing symmetric branching circuit 204, respectively. The X polarized wave transmitter 156 and the Y polarized wave transmitter 158 are connected to the two outputs of the optical variable branching circuit 402, respectively. Even in this alternative example, the intensity of light incident on each of the X polarized wave transmitter 156 and the Y polarized wave transmitter 158 can be made variable, and the intensity of light branched to the transmission circuit side and the receiving circuit side can be made variable.

Third Embodiment

Figure 5:
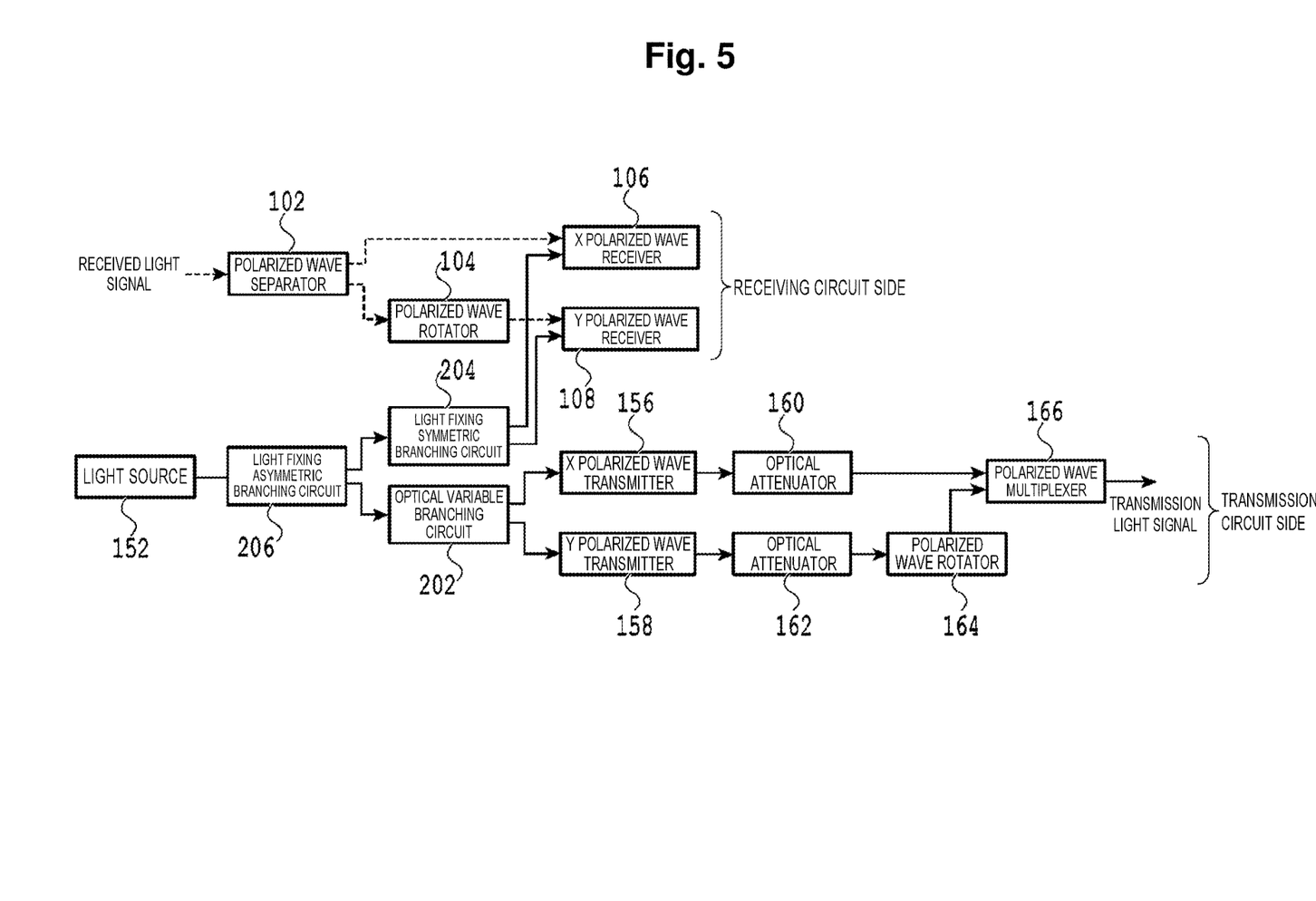
FIG. 5 is a diagram illustrating the configuration of a polarization multiplexing optical transmitting and receiving circuit according to a third embodiment of the present invention.

A polarization multiplexing optical transmitting and receiving circuit according to a third embodiment of the present invention will be described with reference to FIG. 5. FIG. 5 is a circuit diagram illustrating the configuration of the polarization multiplexing optical transmitting and receiving circuit according to the third embodiment of the present invention, in which a part of an optical transmitter/receiver having transmission and receiving functions is illustrated. The polarization multiplexing optical transmitting and receiving circuit branches the continuous light from the light source, superimposes transmission information by using a modulator, and generates an optical output. At the same time, the polarization multiplexing optical transmitting and receiving circuit uses the continuous light from the light source, as local oscillation light of the receiving circuit, and coherent-receives a reception signal.

The polarization multiplexing optical transmitting and receiving circuit illustrated in FIG. 5 is different from the polarization multiplexing optical transmitting and receiving circuit of FIG. 2 in the following points. First, the output of the light source 152 is connected to the input of the light fixing asymmetric optical branching circuit 206. Next, the light fixing symmetric branching circuit 204 is connected to one of the two outputs of the light fixing asymmetric optical branching circuit 206, and the optical variable branching circuit 202 is connected to the other output. Further, the X polarized wave transmitter 156 and the Y polarized wave transmitter 158 are connected to the two outputs of the optical variable branching circuit 202, respectively.

This embodiment is applicable when it is unnecessary to adjust the branching ratio of transmission circuit side:receiving circuit side and it is necessary to adjust the branching ratio of X polarized wave transmitter 156:Y polarized wave transmitter 158.

Fourth Embodiment

In the configuration of the above-described embodiment, in order to efficiently divide the light of the light source 152 into the transmitter and/or the receiver and maximize transmission/reception characteristics regardless of the transmission path, it is necessary to set the branching ratio of the optical variable branching circuits to an optimum value. However, in order to accurately control the branching ratio, it may become necessary to adjust the branching ratio while monitoring the branching ratio during the operation of the transceiver. This is because, in the optical variable branching circuit configured by the interferometer illustrated in FIG. 3 or the like, the interfere state varies depending on temperature dependency, wavelength dependency, and aging deterioration, and the branching ratio fluctuates.

In such a case, the branching ratio of the above-described optical variable branching circuits (202, 402) can be adjusted to the optimum value by a monitor photodetector provided on the transmission circuit side or the receiving circuit side. More specifically, the light of the light source 152 branched to the receiving circuit side is incident on the X polarized wave receiver 106 and the Y polarized wave receiver 108. Since the X polarized wave receiver 106 and the Y polarized wave receiver 108 are configured to receive the received light signal, the input light power can be detected at the same time. Monitoring the photocurrent flowing through the X polarized wave receiver 106 or the Y polarized wave receiver 108 can monitor the light power of the light source 152 branched to the receiving circuit side.

Further, even on the transmitter side, the monitor photodetector is generally integrated on the X polarized wave transmitter 156 or the Y polarized wave transmitter 158. In the modulator provided in the X polarized wave transmitter 156 or the Y polarized wave transmitter 158, in order to control the operation of the modulator, there are a monitor port of the interferometer configuring the modulator and a monitor port outputting a part of the optical signal by tapping (partially branching) the signal light. The monitor photodetector is connected to these ports. By using the monitor photodetector generally provided in this manner, the light power of the light source 152 branched to the transmission circuit side can be monitored.

Alternatively, it is also possible to directly monitor the light of the variable branching circuit without using the generally provided monitor photodetector. By arranging the monitor photodetector, at least, at one of two output ports of the optical variable branching circuit (202, 402) and monitoring the intensity of the light input from the light source 152, the branching of the optical variable branching circuits can be monitored.

The photocurrent received by the above-described monitor photodetector can be used to calculate the branching ratio of the optical variable branching circuits and adjust it to the optimum value.

REFERENCE SIGNS LIST 102 polarized wave separator
104 polarized wave rotator
106 X polarized wave receiver
108 Y polarized wave receiver
152 light source
154 optical branching circuit
156 X polarized wave transmitter
158 Y polarized wave transmitter
160, 162 optical attenuator
164 polarized wave rotator
166 polarized wave multiplexer
202, 402 optical variable branching circuit
204 light fixing symmetric branching circuit
206 light fixing asymmetric branching circuit
302 input waveguide 304 1-input 2-output coupler
306, 308 arm waveguide
310, 312 variable optical phase shifter
314 2-input 2-output coupler

The invention claimed is:

1. A polarization multiplexing optical transmitting and receiving circuit, comprising:
   first and second optical receivers;
   first and second optical transmitters;
   a polarized wave multiplexer that polarization-multiplexes two optical transmitter outputs of the first and second optical transmitters;
   a polarized wave rotator arranged between the first and second optical transmitters and the polarized wave multiplexer, and connected to at least one of the first and second optical transmitters; and
   at least three optical branching circuits that branch light output from a light source to the first and second optical receivers as well as to the first and second optical transmitters,
   wherein the at least three optical branching circuits include:
      an optical variable branching circuit that branches the light output from the light source,
      a first optical branching circuit connected to one of two outputs of the optical variable branching circuit, and
      a second optical branching circuit connected to the other of the two outputs of the optical variable branching circuit,
      wherein
      the first and second optical receivers are connected to two outputs of the first optical branching circuit, respectively, and
      the first and second optical transmitters are connected to two outputs of the second optical branching circuit, respectively.

2. The polarization multiplexing optical transmitting and receiving circuit according to claim 1, wherein the optical variable branching circuit includes:
   a first coupler,
   a second coupler to which two waveguides branched by the first coupler are connected, and
   a phase shifter arranged, at least, at one of the two waveguides.

3. The polarization multiplexing optical transmitting and receiving circuit according to claim 2, wherein the first coupler is a 1-input 2-output power splitter that branches the input light in the same phase.

4. The polarization multiplexing optical transmitting and receiving circuit according to claim 1, wherein the polarization multiplexing optical transmitting and receiving circuit is integrated on one chip.

5. A polarization multiplexing optical transmitting and receiving circuit, comprising:
   first and second optical receivers;
   first and second optical transmitters;
   a polarized wave multiplexer that polarization-multiplexes two optical transmitter outputs of the first and second optical transmitters;
   a polarized wave rotator arranged between the first and second optical transmitters and the polarized wave multiplexer, and connected to at least one of the first and second optical transmitters; and
   at least three optical branching circuits that branch light output from a light source to the first and second optical receivers as well as to the first and second optical transmitters,
   wherein the at least three optical branching circuits include:
      a first optical variable branching circuit that branches the light output from the light source,
      an optical branching circuit connected to one of two outputs of the first optical variable branching circuit, and
      a second optical variable branching circuit arranged at the other of the two outputs of the first optical variable branching circuit,
      wherein
      the first and second optical receivers are connected to two outputs of the optical branching circuit, respectively, and
      the first and second optical transmitters are connected to two outputs of the second optical variable branching circuit, respectively.

6. The polarization multiplexing optical transmitting and receiving circuit according to claim 5, wherein the first optical variable branching circuit includes:
   a first coupler,
   a second coupler to which two waveguides branched by the first coupler are connected, and
   a phase shifter arranged, at least, at one of the two waveguides.

7. A polarization multiplexing optical transmitting and receiving circuit, comprising:
   first and second optical receivers;
   first and second optical transmitters;
   a polarized wave multiplexer that polarization-multiplexes two optical transmitter outputs of the first and second optical transmitters;
   a polarized wave rotator arranged between the first and second optical transmitters and the polarized wave multiplexer, and connected to at least one of the first and second optical transmitters; and
   at least three optical branching circuits that branch light output from a light source to the first and second optical receivers as well as to the first and second optical transmitters,
   wherein the at least three optical branching circuits include:
      a first optical branching circuit that branches the light output from the light source,
      a second optical branching circuit connected to one of two outputs of the first optical branching circuit, and
      an optical variable branching circuit connected to the other of the two outputs of the first optical branching circuit,
      wherein
      the first and second optical receivers are connected to two outputs of the second optical branching circuit, respectively, and
      the first and second optical transmitters are connected to two outputs of the optical variable branching circuit, respectively.

8. The polarization multiplexing optical transmitting and receiving circuit according to claim 7, wherein the optical variable branching circuit includes:
   a first coupler,
   a second coupler to which two waveguides branched by the first coupler are connected, and
   a phase shifter arranged, at least, at one of the two waveguides.

* * * * *